US009370995B2

United States Patent
Jeong

(10) Patent No.: US 9,370,995 B2
(45) Date of Patent: Jun. 21, 2016

(54) EXTERNAL ACTIVE AIR FLAP FOR VEHICLE ENGINE ROOM

(71) Applicant: HYUNDAI MOTOR COMPANY, Seoul (KR)

(72) Inventor: Ji Min Jeong, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/637,313

(22) Filed: Mar. 3, 2015

(65) Prior Publication Data

US 2016/0129778 A1 May 12, 2016

(30) Foreign Application Priority Data

Nov. 12, 2014 (KR) .................. 10-2014-0156863

(51) Int. Cl.
*B60K 11/00* (2006.01)
*B60K 11/08* (2006.01)
*B62D 25/08* (2006.01)

(52) U.S. Cl.
CPC ............ *B60K 11/085* (2013.01); *B62D 25/085* (2013.01)

(58) Field of Classification Search
CPC .. B60K 11/085; B60K 11/08; B60Y 2200/92; B60Y 2306/09; F01P 7/10
See application file for complete search history.

(56) References Cited

U.S. PATENT DOCUMENTS

| | | | | |
|---|---|---|---|---|
| 3,682,085 A * | 8/1972 | Dennis | ..................... | F24F 13/15 454/319 |
| 5,899,196 A * | 5/1999 | Chite | ..................... | F02M 31/06 123/556 |
| 6,988,574 B2 * | 1/2006 | Jones | ................... | B62D 35/008 123/41.58 |
| 7,717,208 B2 * | 5/2010 | Knauer | ..................... | F01P 7/10 180/68.1 |
| 8,161,919 B2 * | 4/2012 | Klotz | ................... | B60K 11/085 123/41.04 |
| 8,443,921 B2 * | 5/2013 | Charnesky | ................ | F01P 7/10 180/68.1 |
| 8,505,660 B2 * | 8/2013 | Fenchak | .............. | B60K 11/085 180/68.1 |
| 8,708,077 B2 * | 4/2014 | Hori | ..................... | B60K 11/085 180/68.1 |
| 8,714,290 B2 * | 5/2014 | Kitashiba | ............. | B60K 11/085 165/41 |
| 8,727,054 B2 * | 5/2014 | Hori | ..................... | B60K 11/085 165/41 |
| 8,794,362 B2 * | 8/2014 | Lee | ..................... | B60K 11/085 180/68.1 |
| 8,825,308 B2 * | 9/2014 | Nishimura | ........... | B60H 1/3208 180/68.1 |

(Continued)

FOREIGN PATENT DOCUMENTS

JP 2008-106727 A 5/2008
KR 10-1997-0065061 A 10/1997

(Continued)

*Primary Examiner* — Brodie Follman
(74) *Attorney, Agent, or Firm* — McDermott Will & Emery LLP

(57) ABSTRACT

An external active air flap for a vehicle engine room includes a fixed flap fixedly installed at a front side of a vehicle and protruding in a forward-backward direction of the vehicle, which acts as a radiator grill. A hinge shaft is disposed inside and along the fixed flap in a left-right direction of the vehicle. A movable flap is disposed on an upper surface of the fixed flap, and a back end of the movable flap is connected with the hinge shaft. The movable flap rotates about the hinge shaft to open and close an opening of the external active air flap by a pressure of external air flowing into the vehicle.

8 Claims, 3 Drawing Sheets

(56) References Cited

U.S. PATENT DOCUMENTS

| | | | | |
|---|---|---|---|---|
| 8,915,320 B2* | 12/2014 | Chinta | | B60K 11/08 180/68.1 |
| 8,983,735 B2* | 3/2015 | Konishi | | B60K 11/085 123/41.04 |
| 9,021,829 B2* | 5/2015 | Jung | | F24F 1/48 160/134 |
| 9,031,748 B2* | 5/2015 | Sakai | | B60K 11/085 701/49 |
| 9,162,562 B2* | 10/2015 | Bourqui | | B60K 11/085 |
| 9,168,828 B2* | 10/2015 | Bourqui | | F16H 19/08 |
| 9,233,605 B2* | 1/2016 | Hijikata | | B60K 11/085 |
| 2011/0005851 A1* | 1/2011 | Doroghazi | | B60K 11/085 180/68.1 |
| 2012/0090906 A1* | 4/2012 | Charnesky | | B60K 11/085 180/68.1 |
| 2012/0097464 A1* | 4/2012 | Waugh | | B60K 11/085 180/68.1 |
| 2012/0270490 A1* | 10/2012 | Turner | | F01P 7/12 454/75 |
| 2013/0223980 A1* | 8/2013 | Pastrick | | F01D 5/00 415/1 |
| 2013/0247862 A1* | 9/2013 | Sakai | | B60K 11/085 123/188.1 |
| 2013/0268164 A1* | 10/2013 | Sugiyama | | B60K 11/085 701/49 |
| 2014/0073233 A1* | 3/2014 | Schmitt | | B60K 11/085 454/143 |
| 2014/0284123 A1* | 9/2014 | Bourqui | | B60K 11/085 180/68.1 |
| 2014/0299077 A1* | 10/2014 | Sowards | | F01P 7/10 123/41.05 |
| 2014/0335778 A1* | 11/2014 | Takanaga | | B60K 11/085 454/333 |
| 2015/0274002 A1* | 10/2015 | Vacca | | B60K 11/085 180/68.1 |

FOREIGN PATENT DOCUMENTS

| | | |
|---|---|---|
| KR | 10-1998-029206 A | 7/1998 |
| KR | 1998-031388 A | 7/1998 |
| KR | 10-2005-0068076 A | 7/2005 |
| KR | 10-2012-0113956 A | 10/2012 |
| KR | 10-2013-0055377 A | 5/2013 |
| KR | 10-2014-0032620 A | 3/2014 |

* cited by examiner

EXTERNAL ACTIVE AIR FLAP FOR VEHICLE ENGINE ROOM

CROSS-REFERENCE(S) TO RELATED APPLICATION

The present application claims the benefit of priority to Korean Patent Application No. 10-2014-0156863, filed on Nov. 12, 2014, the entire contents of which is incorporated herein for all purposes by this reference.

TECHNICAL FIELD

The present invention relates to an external active air flap for a vehicle engine room, and more particularly, to an external active air flap for a vehicle engine room in which a fixed flap acting as a radiator grill and a movable flap to control inflow of external air are separately constructed.

BACKGROUND

There are components for driving in a vehicle engine room, such as an engine and various heat exchangers, such as an intercooler, evaporator, and condenser.

Heat exchange media mainly flow inside of the heat exchangers described above, and the heat exchange media in the heat exchangers and air outside of the heat exchangers mutually exchange heat whereby cooling or radiation is performed, and for a stable operation of the various heat exchangers in the vehicle engine room the external air must be satisfactorily provided into the engine room.

However, when a vehicle drives in a high speed, a large amount of external air quickly flow in whereby an air resistance becomes extremely large, thereby increasing fuel consumption.

To solve that problem, an active air flap is developed which increasing an opening angle in a low speed thereby increasing the inflow amount of the air, and decreasing the opening angle in the high speed, thereby decreasing the inflow amount of the air and improving the fuel consumption.

There are a built-in air flap (shroud duct type) which controls an opening and closing of a flap by a flap driver installed behind a duct surrounding a radiator grill, and an external air flap (radiator-grill integrated type) which controls to directly open and close by making the radiator grill act as the flap disclosed in the conventional art.

The built-in active air flap described above has higher design freedom and is subject to less package constraint of the flap driver compared to the external active air flap which has an effect of improving an aerodynamic performance compared to the built-in active air flap.

However, the external active air flap is constructed in such a way that the radiator grill acts as flap which controls the inflow of the exterior air, and thereby, a large torque is required to forcedly open and close the flap in a high speed condition, and a motor of larger capacity must be used for the larger torque, thus increasing cost.

The description provided above as a related art of the present disclosure is just for helping in understanding the background of the present disclosure and should not be construed as being included in the related art known by those skilled in the art.

SUMMARY

An aspect of the present inventive concept provides an external active air flap for a vehicle engine room in which a fixed flap acting as a radiator grill and a movable flap controlling an inflow of external air are separately provided such that the movable flap rotates on the fixed flap by a pressure of the external air flowing into a vehicle, thereby removing the use of a motor for opening and closing of a movable flap and thus reducing cost and weight.

Another aspect of the present inventive concept provides an external active air flap for a vehicle engine room in which the movable flap is fixedly opened when the inflow of the external air into the engine room is necessary in a vehicle high speed, thereby preventing a damage of vehicle components in the engine room due to a high temperature.

According to an exemplary embodiment of the present inventive concept, an external active air flap for a vehicle engine room includes a fixed flap fixedly installed at a front side of a vehicle and protruding in a forward-backward direction of the vehicle, and which acting as a radiator grill. A hinge shaft disposed inside and along the fixed flap in a left-right direction of the vehicle. A movable flap disposed on an upper surface of the fixed flap, and a back end of which is connected with the hinge shaft. The movable flap rotates about the hinge shaft to open and close an opening of the external active air flap by a pressure of external air flowing into the vehicle.

A plurality of the fixed flaps may be provided to be spaced apart from each other in an upward-downward direction of the vehicle. Each the fixed flap has one movable flap is arranged disposed thereon.

The fixed flap may be a back end being curved and bent toward the front side of the vehicle, in which a flap insertion recess is formed along the left-right of the fixed flap between the hinge shaft and a curved portion of the fixed flap and is opened forward.

The external active air flap may further include a flap driver connected to the hinge shaft to insert and draw the hinge shaft and the movable flap into and out of the flap insertion recess by moving the hinge shaft and the movable flap along the upper surface of the fixed flap.

The flap driver may include a shaft engagement member to which one end of the hinge shaft is rotatable connected. A rack is integrally combined with the shaft engagement member and both ends of which are arranged on an upper surface of the shaft engagement member the in the left-right direction of the vehicle. A pinion is geared with the rack. A driving motor is connected to the pinion to transmit a power. A controller is configured to control the actuation of the driving motor.

The movable flap may rotate about the hinge shaft only when the movable flap is drawn out of the flap insertion recess and is fixedly disposed inside the flap insertion recess when the movable flap is inserted into the flap insertion recess.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present disclosure.

Figure 1:
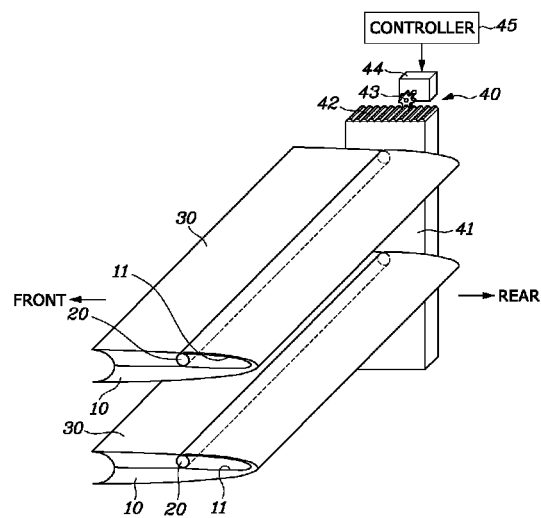
FIG. 1 is a view showing an external active air flap for a vehicle engine room according to the present disclosure, with the movable flap opened.

It should be understood that the appended drawings are not necessarily to scale, presenting a somewhat simplified representation of various features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present inventive concept, examples of which are illustrated in the accompanying drawings and described below. While the disclosure will be described in conjunction with exemplary embodiments, it will be understood that the present description is not intended to limit the disclosure to those exemplary embodiments. On the contrary, the invention is intended to cover the exemplary embodiments as well as various alternatives, modifications, equivalents and other embodiments, which may be included within the spirit and scope of the disclosure as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an external active air flap for a vehicle engine room according to an exemplary embodiment of the present disclosure will be described with reference to the accompanying drawings.

Figure 2:
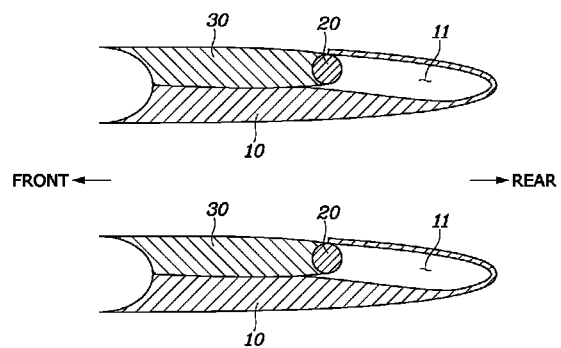
FIG. 2 is a sectional view of FIG. 1.

An external active air flap for a vehicle engine room according to the present disclosure comprises, as shown in FIGS. 1 and 2, a fixed flap 10 acts as a radiator grill and is fixedly installed at a front side of a vehicle and protruding in a forward-backward direction of the vehicle. A hinge shaft 20 is disposed inside and along the fixed flap 10 in a left-right direction of the vehicle. A movable flap 30 is disposed on an upper side of the fixed flap 10 and a back end of which is connected with the hinge shaft. The movable flap 30 rotates about the hinge shaft 20 to open and close an opening of the external active air flap by a pressure of external air flowing into the vehicle.

The vehicle body has a length in a left-right direction of the vehicle body, which is longer than that in a forward-backward direction of the vehicle body. The movable flap 30 has the same length as that of the fixed flap 10 is in the left-right direction and has a shorter length than that of the fixed flap 10 in the forward-backward direction.

A plurality of the fixed flaps 10 are arranged to be spaced apart from each other in the upward-downward direction, and each the fixed flap 10 has one movable flap 30 attached thereon.

The fixed flap 10 has a back end being curved and bent toward the front side of the vehicle, in which a flap insertion recess 11 is formed along the fixed flap in the left-right of the vehicle between the hinge shaft 20 and a curved portion of the fixed flap 10 and is opened forward.

The flap insertion recess 11 may have an angle inclined further downward going further backward to easily move the hinge shaft 20 and the movable flap 30 backward and inserted into the flap insertion recess 11 by actuation of a flap driver as will be described later.

The present disclosure further comprises a flap driver 40 which is connected to the hinge shaft 20 and is actuated to insert and draw the hinge shaft 20 and the movable flap 30 into and out of the flap insertion recess 11 by moving the hinge shaft 20 and the movable flap 30 along an upper side of the fixed flap 10.

The flap driver 40 comprises a shaft engagement member 41 to which one end of the hinge shaft 20 is engaged rotatable. A rack 42 is integrally combined with the shaft engagement member 41 and both ends of which are arranged on an upper surface of the shaft engagement member the in the left-right direction of the vehicle. A pinion 43 is geared with the rack 42, and a driving motor 44 is connected to the pinion 43 to transmit a power. A controller 45 is configured to control the actuation of the driving motor 44.

The shaft engagement member 41 may have a link or a rod such as a bar.

In addition, both ends of the hinge shaft 20 are respectively engaged to the shaft engagement member 41 to rotate axially.

The controller 45 controls the actuation of the driving motor 44 by transmitting a signal from an engine and various heat exchangers such as a radiator, intercooler, evaporator, or condenser installed in an engine room.

The movable flap 30 may rotate with the hinge shaft 20 as a center only when the movable flap 30 is drawn out of the flap insertion recess 11 and not able to rotate due to restraint by the flap insertion recess 11 when the movable flap 30 is inserted into the flap insertion recess 11.

Hereinafter, the action of the embodiment of the present inventive concept will be described.

FIGS. 1 and 2 show a condition where a vehicle is running at a low speed and the movable flap 30 is drawn out of the flap insertion recess 11.

In the low speed, since a pressure of external air flowing into the engine room is not high, the movable flap 30 is in tight contact with the fixed flap 10 such that the opening between each fixed flap 10 remains being opened therebetween to open the external active air flap, and thereby, the external air flows into the engine room through an opened passage of the fixed flap 10 so as to be able to efficiently cool the engine and the heat exchangers.

Figure 3:
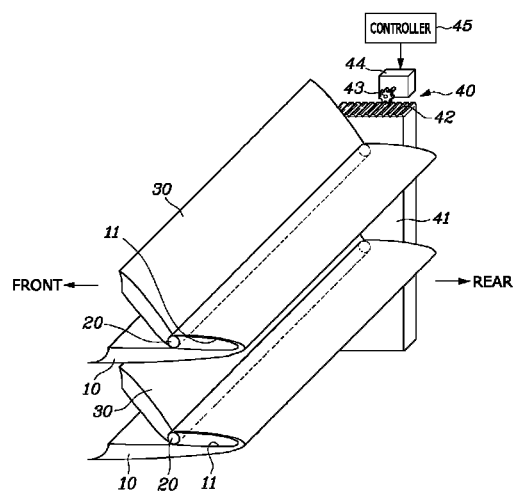
FIG. 3 is a view showing an external active air flap according to the present disclosure, with the movable flap closed.
Figure 4:
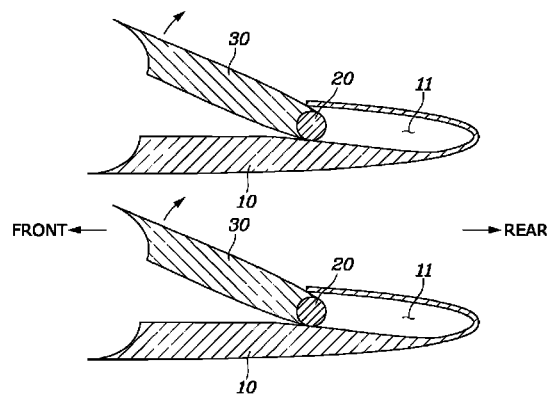
FIG. 4 is a sectional view of FIG. 3.

FIGS. 3 and 4 show a condition where the vehicle is running at a high speed.

In the high speed, since the pressure of external air flowing into the engine room is high, the forward end of the movable flap 30 rotates with the hinge shaft 20 as a center by a pressure of external air thereby decreases or closes the opened passage of the fixed flap 10.

At this time, since a flow rate of the air into the engine room decreases, fuel consumption and noise can be improved.

Figure 5:
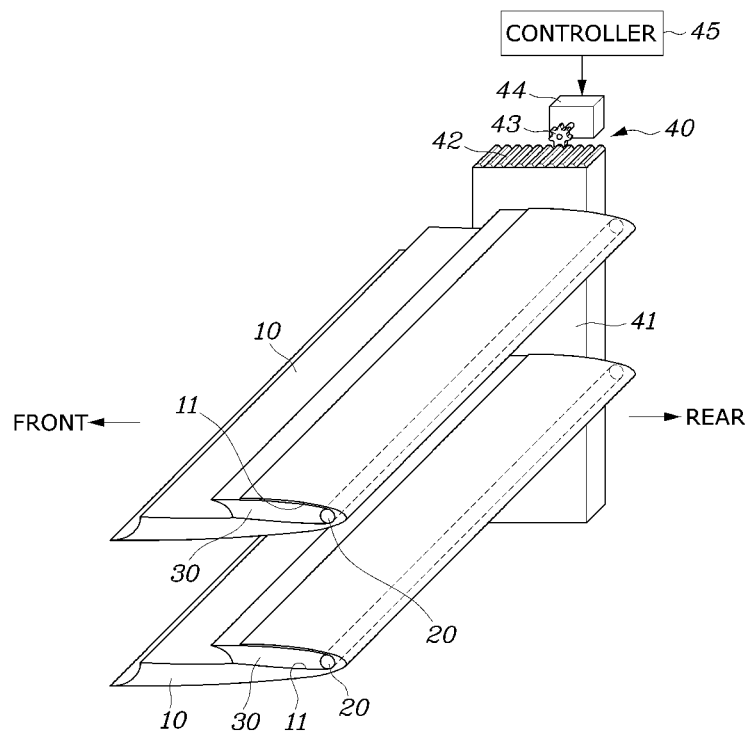
FIG. 5 is a view showing an external active air flap according to the present disclosure, with the movable flap being inserted into a flap insertion recess.
Figure 6:
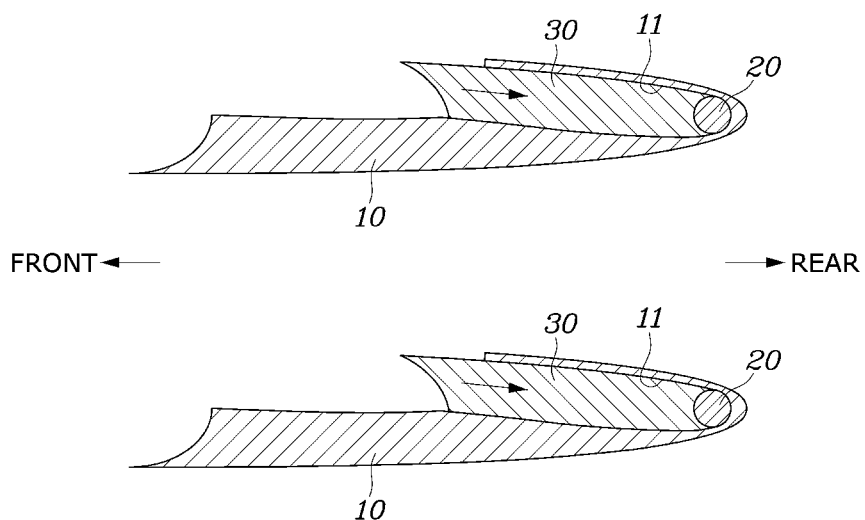
FIG. 6 is a sectional view of FIG. 5.

FIGS. 5 and 6 show an emergency state occurring in the high speed.

As stated above, in the high speed, the movable flap 30 rotates by the pressure of air thereby decreases or closes the opened passage of the fixed flap 10, and in this state, if the engine or the heat exchangers installed in the engine room are overheated so that a temperature increases, main components of the vehicle can be damaged.

Therefore, in the high speed, if components of the vehicle installed in the engine room are overheated, sensors detect this state and send a signal to the controller 45, and the controller 45 actuates the driving motor 44 based on the received signal.

Then, the rack 42 and the shaft engagement member 41 move backwards due to the rotation of the pinion 43, and the hinge shaft 20 engaged with the shaft engagement member 41 and the movable flap 30 move backwards so as to be inserted into the flap insertion recess 11 formed at the fixed flap 10.

If the movable flap 30 is inserted into the flap insertion recess 11 as described above, the movable flap 30 comes in close contact with the fixed flap 10 by the flap insertion recess 11 so as not to be able to rotate even if the pressure of the air is transmitted to the movable flap 30 in the high speed, and thereby, the amount of external air flowing into the engine room through the opened passage of the fixed flap 10 in the low speed increases, thus efficiently cooling the engine and the heat exchangers and preventing an failure due to the heat.

Then, if the overheated engine and heat exchangers are cooled by the external air to return to a normal temperature, the hinge shaft 20 and the movable flap 30 are drawn out of the flap insertion recess 11 by the flap driver 40, thereby returning to an initial condition shown in FIG. 2 in preparation of the next operation.

As stated above, the embodiment of the present inventive concept has a construction that the movable flap 30 can rotate about the fixed flap 10 by the pressure of the air in the high speed so as to be able to open and close the fixed flap 10, thereby removing the operation of a motor for opening and closing the movable flap 30 and reducing cost and weight.

In addition, according to the present disclosure, when an inflow of external air into the engine room is necessary in the high speed, the movable flap 30 is inserted into the flap insertion recess 11 formed at the fixed flap 10 so as to be fixed, thereby maintaining the passage of the fixed flap 10 opened and preventing damage of the vehicle components in the engine room due to high heat.

According to the external active air flap of the present disclosure, the movable flap can rotate about the fixed flap by the pressure of the air in the high speed to open and close the fixed flap, thereby removing the use of a motor for operation of opening and closing the movable flap and reducing cost and weight.

In addition, the present disclosure has an effect that in a situation where the inflow of external air into the engine room is necessary in the high speed, the movable flap is inserted into the flap insertion recess formed at the fixed flap so as to be fixed, thereby maintaining the passage of the fixed flap opened and preventing the damage of the vehicle components in the engine room due to the high heat.

The disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An external active air flap for a vehicle engine room comprising:
    a fixed flap fixedly installed at a front side of a vehicle and protruding in a forward-backward direction of the vehicle, the fixed flap acting as a radiator grill;
    a hinge shaft disposed inside and along the fixed flap in a left-right direction of the vehicle; and
    a movable flap disposed on an upper surface of the fixed flap and a back end of which being connected with the hinge shaft,
    wherein the movable flap rotates about the hinge shaft to open and close an opening of the external active air flap by a pressure of external air flowing into the vehicle.

2. The external active air flap of claim 1, wherein a plurality of the fixed flaps are provided to be spaced apart from each other in an upward-downward direction of the vehicle, and each fixed flap has one movable flap disposed thereon.

3. The external active air flap of claim 1, wherein the back end of the fixed flap is curved and bent toward the front side of the vehicle, in which a flap insertion recess is formed a space between the hinge shaft and a curved portion of the fixed flap along the fixed flap in the left-right of the vehicle and is opened forward.

4. The external active air flap of claim 3, further comprising: a flap driver connected to the hinge shaft to insert and draw the hinge shaft and the movable flap into and out of the flap insertion recess by moving the hinge shaft and the movable flap along the upper surface of the fixed flap.

5. The external active air flap of claim 4, wherein the flap driver comprises:
    a shaft engagement member to which one end of the hinge shaft is rotatable connected;
    a rack integrally combined with the shaft engagement member and both ends of which are arranged on an upper surface of the shaft engagement member the in the left-right direction of the vehicle;
    a pinion geared with the rack;
        a driving motor connected to the pinion and transmitting a power; and
        a controller configured to control an operation of the driving motor.

6. The external active air flap of claim 4, wherein the movable flap rotates about the hinge shaft only when the movable flap is drawn out of the flap insertion recess and is fixedly disposed inside the flap insertion recess when the movable flap is inserted into the flap insertion recess.

7. The external active air flap of claim 5, wherein the shaft engagement member is a rod or a link.

8. The external active air flap of claim 5, wherein both ends of the hinge shaft are respectively engaged to the shaft engagement member to rotate axially.

* * * * *